Feb. 16, 1926. 1,573,760
W. M. BLACK
MILK COOLER
Filed August 31, 1925
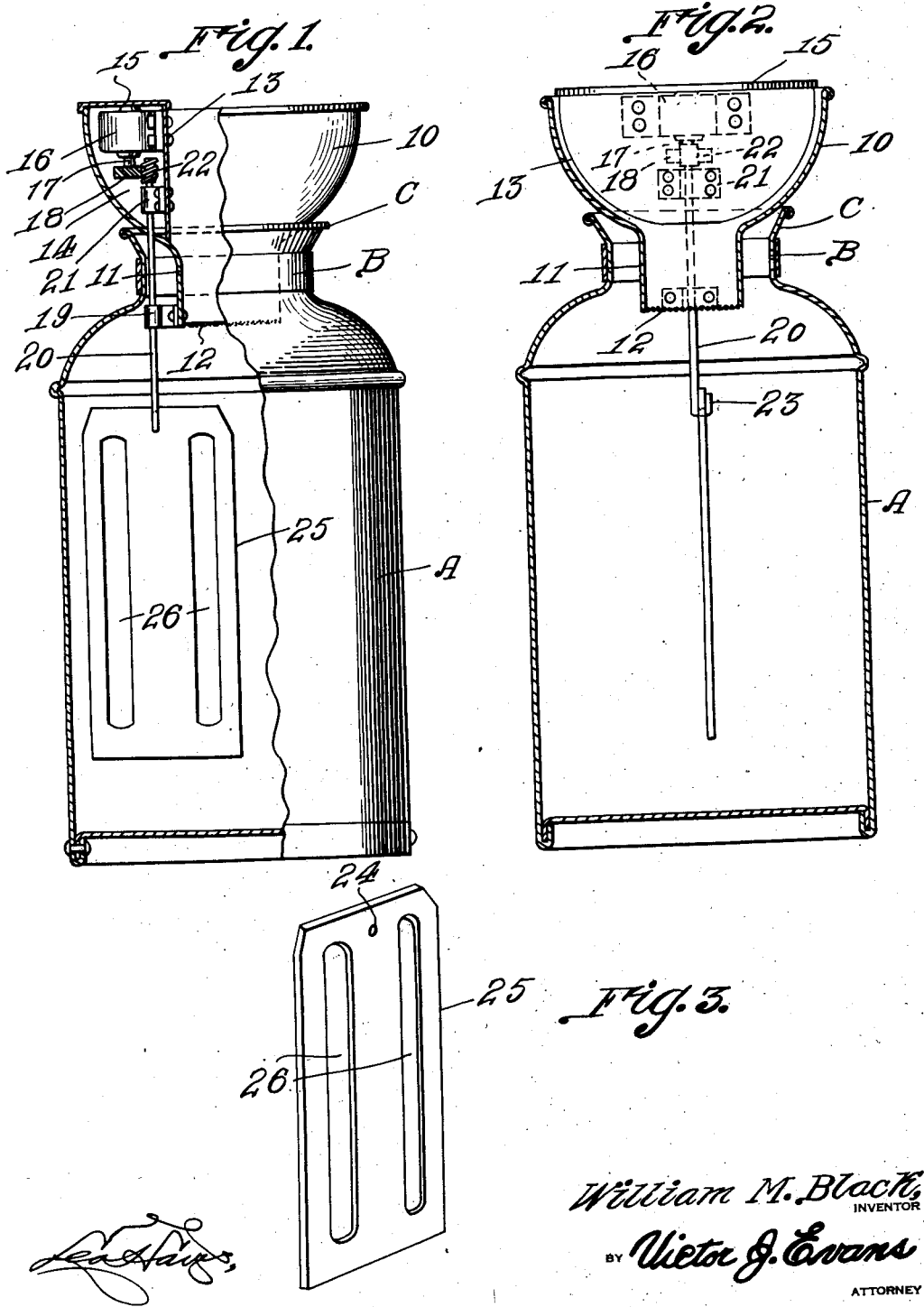

Patented Feb. 16, 1926.

1,573,760

UNITED STATES PATENT OFFICE.

WILLIAM MACKIE BLACK, OF LANSING, MICHIGAN.

MILK COOLER.

Application filed August 31, 1925. Serial No. 53,715.

*To all whom it may concern:*

Be it known that I, WILLIAM MACKIE BLACK, a subject of the King of Great Britain, residing at Lansing, in the county of Ingham and State of Michigan, have invented new and useful Improvements in Milk Coolers, of which the following is a specification.

This invention relates to a dairy apparatus, particularly to milk cooling devices, and has for its object the provision of a novel device by means of which milk may be agitated or stirred within a container immersed within cold water, the object being to agitate and keep the milk in circulation so that the entire mass thereof will come in contact with the walls of the receptacle or container which are cooled by contact with the water within which the device is immersed.

An important object is the provision of a device of this character which may be constructed as a complete and separate entity adapted for use upon already existing milk cans or the like, the device embodying an agitator or stirrer together with motor means of some preferred type for driving the same.

An additional object is the provision of a device of this character which will be simple and inexpensive in manufacture, easy to use, positive in action, efficient and durable in service, and a general improvement in the art.

With the above and other objects and advantages in view, the invention consists in the details of construction, the arrangement and combination of parts to be hereinafter more fully described and claimed, and illustrated in the accompanying drawings, in which:—

Figure 1 is a side elevation, partly broken away and in section, showing the device in applied position upon a milk can.

Figure 2 is a vertical section taken at right angles to Figure 1, and

Figure 3 is a detail perspective view of the paddle alone.

Referring more particularly to the drawings, the letter A designates a suitable container which may, in actual practice, be an ordinary milk can having the usual neck portion B terminating in a flaring mouth C.

In carrying out the invention, I provide a cup-like member 10 which acts as a funnel and which has a reduced extension 11 which enters within the receptacle or can A when the member 10 is placed upon the mouth C thereof. At its bottom, the extension 11 is provided with a screen 12 so that the device will be capable of employment as a strainer.

Located within the member 10 and extending transversely thereof is a partition 13 which defines a compartment 14 normally closed by a removable cover 15 provided for the purpose of preventing milk from splashing into the compartment. Located within this compartment and mounted upon the partition 13 or on any other suitable portion is a motor 16 which may be an electric motor or a clockwork mechanism, as preferred, there being no limitation in this respect. This motor is here represented as having its shaft 17 equipped with a worm gear 18 for a purpose to be explained.

Secured to the lower portion of the extension 11 and extending laterally therefrom is a suitable bearing 19 through which is journaled a depending shaft 20 which is also journaled through a bearing 21 mounted on the partition member 13. At its upper end this shaft carries a worm gear 22 meshing with the worm gear 18 for the purpose of effecting driving of the shaft 20. At its lower end the shaft 20 terminates in a hook 23 upon which is suspended, by means of a hole 24, a paddle 25 which may be of elongated rectangular formation as shown and preferably provided with slots or openings 26 therethrough.

In the operation, it is obvious that milk poured through the member 10 will be strained in the usual manner. It is intended that when the device is full of milk that it be immersed within cold water such as in a spring or the like. When the motor 16 is set in operation, it is quite apparent that the rotation of the shaft 20 and paddle member 25 carried thereby will effect a thorough agitation of the milk so that it will be quickly cooled by contact with the walls of the receptacle or container. The device is very simple in operation inasmuch as it requires no manual effort and it facilitates the cooling of milk with the consequent advantage of improvement in the quality thereof. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

In combination with a milk can or other receptacle, a funnel member adapted to be mounted thereon and having an extension extending thereinto and provided with a screen in its bottom to serve as a strainer, a shaft journally supported by the funnel member, an agitating member carried by the shaft and located within the milk can, a partition within the funnel member defining a separate compartment having a closure and motor mechanism mounted within said compartment and operatively connected with said shaft for driving the same.

In testimony whereof I affix my signature.

WILLIAM MACKIE BLACK.